United States Patent

Höflinger

[11] Patent Number: 5,600,709
[45] Date of Patent: Feb. 4, 1997

[54] TELEPHONE SET FOR AN INTEGRATED SERVICES DIGITAL NETWORK (ISDN)

[75] Inventor: Jürgen Höflinger, Röthenbach, Germany

[73] Assignee: U.S. Philips Corporation, New York, N.Y.

[21] Appl. No.: 408,086

[22] Filed: Mar. 21, 1995

Related U.S. Application Data

[63] Continuation of Ser. No. 133,825, Oct. 7, 1993, abandoned, which is a continuation of Ser. No. 760,547, Sep. 16, 1991, abandoned.

[30] Foreign Application Priority Data

Sep. 18, 1990 [DE] Germany ............... 40 29 528.1

[51] Int. Cl.$^6$ .................................................. H04M 11/00
[52] U.S. Cl. .............................................. 379/61; 370/524
[58] Field of Search .............................. 379/58, 61, 63; 370/110.1

[56] References Cited

U.S. PATENT DOCUMENTS

| 4,682,351 | 7/1987 | Makino | 379/61 X |
| 4,782,518 | 11/1988 | Mattley et al. | 379/201 |
| 5,023,869 | 6/1991 | Grover et al. | 370/84 |
| 5,040,177 | 8/1991 | Martin et al. | 379/61 X |

FOREIGN PATENT DOCUMENTS

| 5871390 | 1/1991 | Australia . | |
| 0408024 | 1/1991 | European Pat. Off. . | |
| 3434686 | 4/1986 | Germany | 379/61 |
| 1194732 | 8/1989 | Japan . | |
| 1260962 | 10/1989 | Japan . | |

OTHER PUBLICATIONS

ISDN (PKI Tech. Mitt. 1988) vol. 1, pp. 19–22.
PATSY (PKI Tech. Mitt. 1988) vol. 2, pp. 7–14.
ISDN (PKI Tech. Mitt. 1987) vol. 1, pp. 13–18.

Primary Examiner—Curtis Kuntz
Assistant Examiner—G. J. Oehling
Attorney, Agent, or Firm—Michael Balconi-Lamica

[57] ABSTRACT

A digital-line telephone unit having two sets combined in one housing with partially shared circuitry. The unit connects directly to an integrated services digital network (ISDN) and includes both a handset with connection cord and a cordless set. A single digital line terminating unit, a main circuit for the corded telephone, and an auxiliary circuit for the cordless phone are connected to an internal digital bus. The main circuit and auxiliary circuit each contain a respective speech processor. Transmission from the corded handset and the cordless handset can occur simultaneously over different message channels of the ISDN.

8 Claims, 2 Drawing Sheets

TELEPHONE SET FOR AN INTEGRATED SERVICES DIGITAL NETWORK (ISDN)

This is a continuation of application Ser. No. 08/133,825, filed Oct. 7, 1993 (now abandoned) which is a continuation of application Ser. No. 07/760,547, filed Sep. 16, 1991, now abandoned.

BACKGROUND OF THE INVENTION

The invention relates to a telephone set for an integrated services digital network (ISDN) comprising a main circuit at least for transmitting signals between a handset with a cord and a line terminating unit which can be coupled to an interface for the integrated services digital network.

The integrated services digital network (ISDN) makes a plurality of communication services between integrated standardized user interfaces possible. For transmitting narrow-band messages (speech, data and text communication etc.) over a line, two B-channels having each a capacity of 64 kbit/s are available. A D-channel with 16 kbit/s is provided as a signalling channel for transmitting switching information signals. In the subscriber area of an integrated services digital network an So-interface is available to which a telephone set can be connected.

The telephone set mentioned above for an integrated services digital network is known from the publication entitled "ISDN Komfortsprechapparat SET 50 mit integrierter Datenschnittstelle" by P. Hirth and B. Lurz, PKI Technische Mitteilungen, Vol. 1, 1988, pp. 19 to 22. The telephone set is coupled to an So-interface of the integrated services digital network by means of its line terminating unit. The line terminating unit and also a circuit for controlling keypad and an indicator and the speech processing circuit are controlled by a main control circuit over a bus system, over which speech signals, control signals, address signals etc. are transported. The speech processing circuit in which a handset with a cord and a loudspeaker/microphone combination for handsfree operation are available, comprises an analog-to-digital converter and a digital-to-analog converter. Furthermore, the circuit comprises an adapter circuit connected to the bus system and which is capable of transmitting or receiving data by means of a data interface (for example, V24 interface). With such a telephone set the advantages of the integrated services digital network can be made use of when a telephone call is made. However, the handset with a cord is connected to the stationary section of the telephone set, so that the telephone subscriber is restricted in his movements.

A telephone set with a mobile handset (cordless telephone set) which may be known from the article entitled "PATSY—ein schnurloses Komforttelefon" by J. H öflinger and G. Ranner, PKI-Technische Mitteilungen, Vol. 2, 1988, pp. 7 to 14, increases the freedom of movement when having a telephone conversation. Such a telephone set with a mobile handset does not have any So interface for the integrated services digital network, but an analog a/b interface. An adapter for adapting the a/b interface to the So interface could be inserted. Such an adapter, however, is not inexpensive. Furthermore, when the mobile handset is used it is not possible to use the advantages of the integrated services digital network when used with a telephone set comprising a handset with a cord.

SUMMARY OF THE INVENTION

Therefore, it is an object of the invention to provide a telephone set which offers further options to the telephone subscriber.

With a telephone set of the type mentioned in the preamble this object is achieved in that the line terminating unit is arranged for transmitting signals over an auxiliary circuit coupled to the main circuit and a radio transmission link to at least one mobile handset and is arranged for transmitting signals of the handset with a cord and the mobile handset over different B-channels of the integrated services digital network (ISDN), and in that the auxiliary circuit is arranged for processing and transmitting signals between the line terminating unit and the radio transmission link.

In this telephone set the main circuit, which is connected to the handset with a cord, is coupled to an auxiliary circuit which receives signals from a mobile handset and sends them to this mobile handset respectively. Signals from the auxiliary circuit are transported over the main circuit to the line terminating unit of the Sointerface of the integrated services digital network (ISDN) and-transported back from the ISDN So-interface over the line terminating unit and main circuit to the auxiliary circuit. The signals of the auxiliary circuit are then transported over a B-channel. Simultaneously, signals from the handset with a cord may be supplied over the second B-channel. The telephone set may also be structured in such a way that a plurality of mobile handsets are capable of exchanging signals over a radio transmission link to the auxiliary circuit and thus to the ISDN So-interface.

Because the ISDN So-interface is used by the mobile handset and handset with a cord, no further adapter for connection to an ISDN interface is necessary for the mobile handset. The telephone subscriber operating the mobile handset may furthermore use the advantages of the ISDN connection. In addition, two conversations may be led simultaneously over a single telephone set and conversations may even be conducted, on the one hand, over the handset with a cord and, on the other hand, over the mobile handset.

A signal exchange between the main circuit and the auxiliary circuit may simply be realised when the circuit components of the main and auxiliary circuits are interconnected and connected to each other over a bus system.

In a preferred embodiment of the invention the main circuit comprises a speech processor coupled to the handset with a cord, for exchanging signals between the speech processor and the line terminating unit over the bus system, and a main control circuit for controlling the line terminating unit and the speech processor by means of control signals over the bus system.

For transmitting data, for example, by means of a personal computer an adapter circuit coupled to the bus system and controlled by the main control circuit is included in the main circuit, which adapter circuit is used for receiving data from a data interface.

In the preferred embodiment of the invention the auxiliary circuit comprises a base radio circuit, or transceiver, for transmitting and receiving signals over the radio transmission link;

a base speech processor coupled to the base radio circuit and the line terminating unit over the bus system, for exchanging signals, and an auxiliary control circuit coupled to the bus system for controlling the base radio circuit and the base speech processor. In addition, the main control circuit supplies control signals to the auxiliary control circuit over the bus system. The base speech processor converts the digital signals received over the bus system into analog signals which it applies to the base radio circuit and converts the analog signals received from the base radio circuit into digital signals.

In the preferred embodiment the mobile handset comprises:

a mobile radio circuit for transmitting and receiving signals over the radio transmission link, a mobile speech processor for exchanging speech signals between the mobile speech processor and the mobile radio circuit, and a mobile control circuit for controlling the mobile speech processor and the mobile radio circuit.

In the mobile handset the analog signals transmitted by the mobile radio circuit are further processed in the analog mode by the mobile speech processor and applied to a loudspeaker in the mobile handset and, conversely, the analog signals supplied by a microphone in the mobile handset are applied to the mobile radio circuit by the mobile speech processor.

The mobile handset is supplied with power from a rechargeable battery. For recharging the battery a battery charger is used. A battery charger for a battery included in the mobile handset may be accommodated in a housing together with the auxiliary circuit. However, a battery charger may also be devised as a charging cradle for the mobile handset which is accommodated at a location remote from the housing comprising the main and auxiliary circuits. In that case the charging cradle in the housing of the auxiliary circuit can be omitted.

Up to eight terminal units can be connected to an ISDN base unit having an So-interface. Each of these terminal units can be reached with a common dialling number. Additionally, an extension number may be added to the original subscriber number for each terminal unit so that each terminal unit can be reached individually. In the telephone set according to the invention there may be provided that the handset with a cord and at least one mobile handset can be reached individually by adding an extension figure to the dialling number.

An exemplary embodiment of the invention will be further explained with reference to the drawing.

DESCRIPTION OF THE PREFERRED EMBODIMENT

Figure 1A:
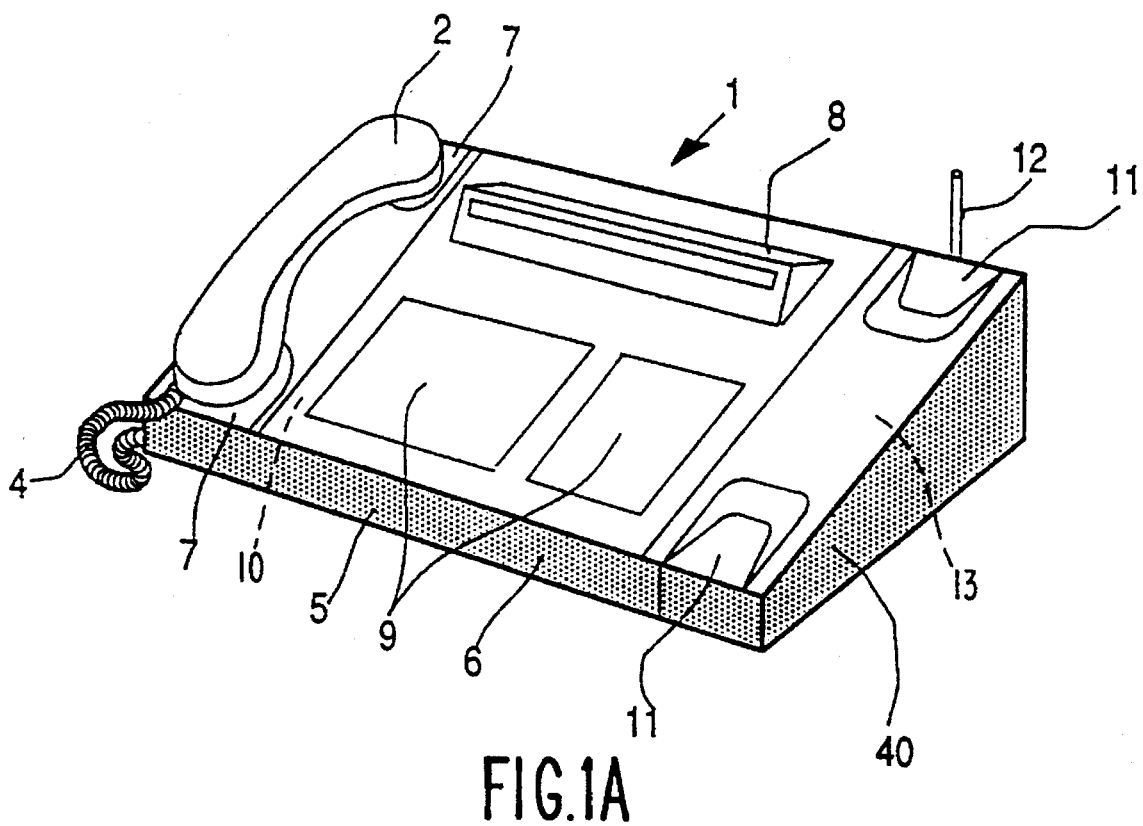
FIG. 1 gives a diagrammatic representation of a telephone set for an integrated services digital network comprising a mobile handset and a handset with a cord.
Figure 1B:
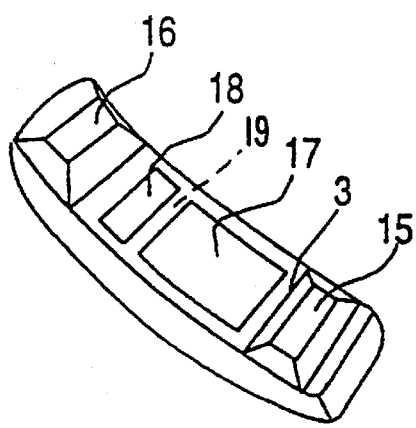

FIG. 1 shows a telephone set 1 for an integrated services digital network (ISDN) comprising a handset 2 with a cord and a mobile handset 3. The handset with a cord 2 which comprises a microphone and a loudspeaker is connected to a stationary section or housing 5 of the telephone set 1 by means of a cord 4. The housing 5 comprises a main module 6 which includes a charging module 7 for the handset with a cord 2, a display 8 and key pads 9. The main module 6 also accommodates a main circuit 10. A sub-module 40 belonging to the housing 5 is connected to the main module 6. The sub-module 40 comprises charging cradles 11 for the mobile handset 3 and an aerial 12. Furthermore, the sub-module includes an auxiliary circuit 13 and a battery charger which charges a rechargeable battery 14 in the mobile handset 3 when the mobile handset 3 is located in the cradles 11. The mobile handset 3 comprises a microphone 15, a loudspeaker 16, a key pad 17, a display 18 and a mobile circuit 19.

The main module 6 further accommodates a hands free facility with a microphone and a loudspeaker, an analog input, for example, for transmitting analog signals to a cassette recorder, and a data interface, for example, a V24 interface to which a data processor, for example, a personal computer, can be connected and an ISDN So-interface (base unit). A line junction over which the digital signals are processed in two B-channels of 64 kbit/s each is connected to the ISDN So-interface. Furthermore, there is provided a D-channel with 16 kbit/s for call processing.

Figure 2:
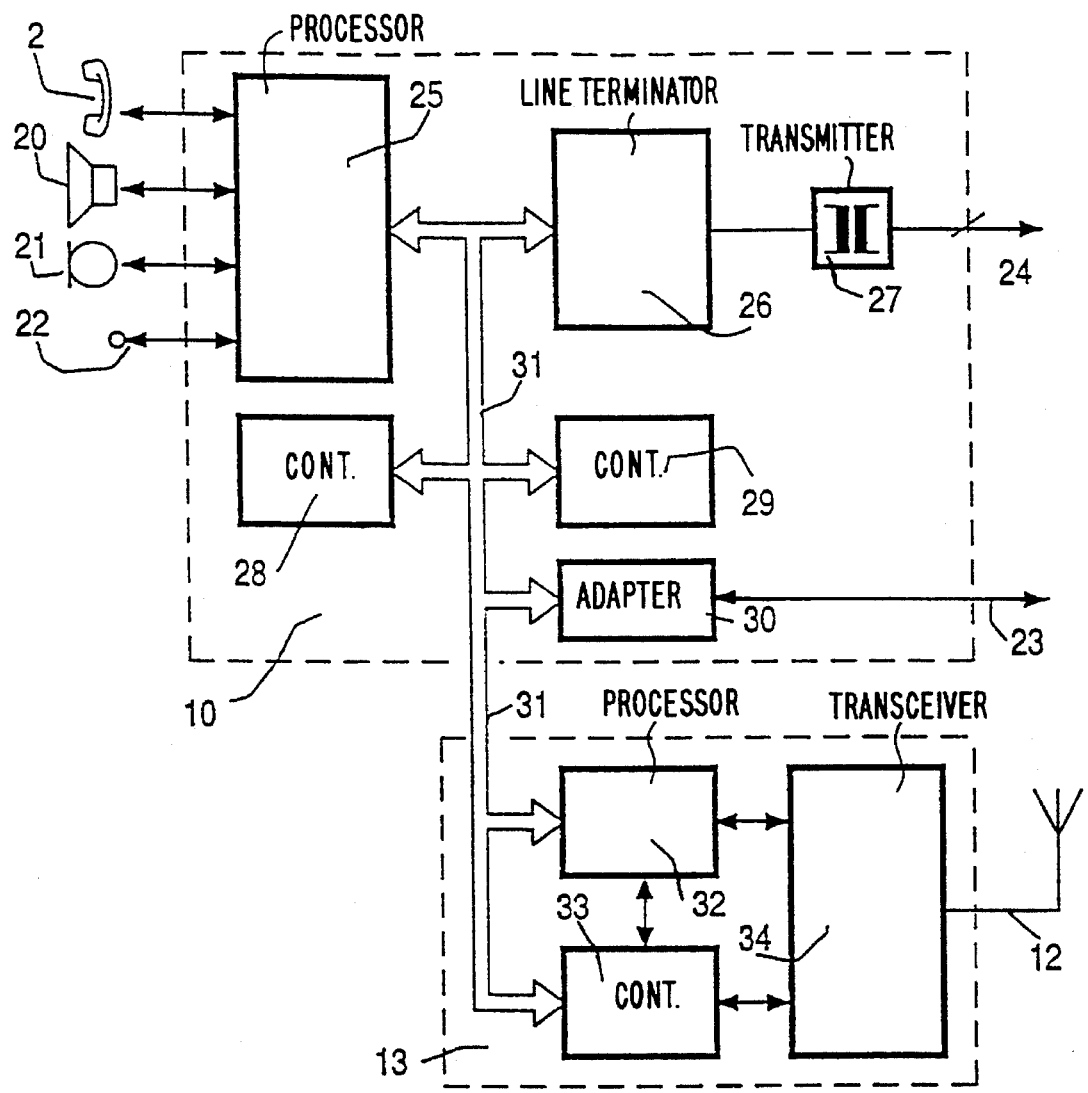
FIG. 2 shows a block diagram of a circuit arrangement used in the telephone set represented in FIG. 1.
Figure 2:
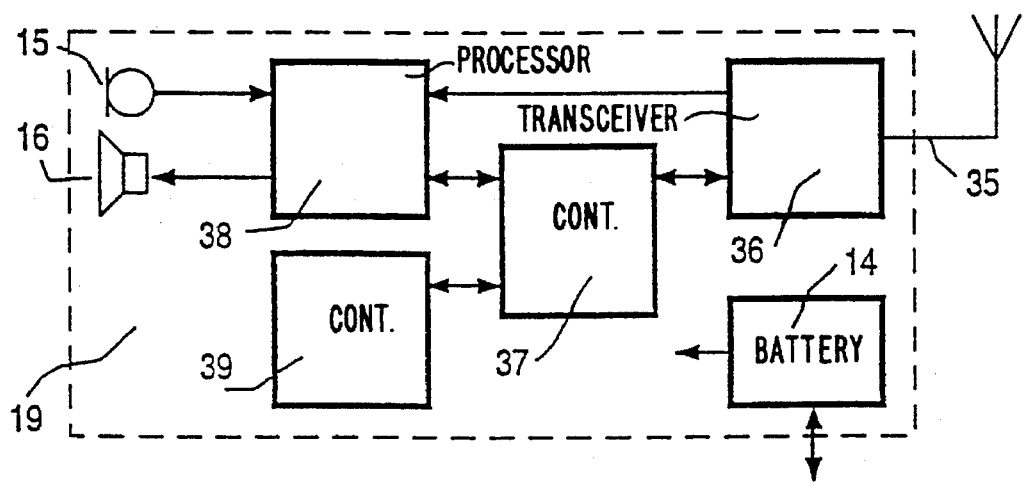

FIG. 2 shows a block diagram of the main circuit 10, the auxiliary circuit 13 and the mobile circuit 19. The main circuit 10 which is accommodated in the main module 6, comprises a speech processor 25, a line terminating unit 26, a transmission arrangement 27, a circuit 28 for controlling the display 8 and the key pad 9, a main control circuit 29 and an adapter circuit 30. The ISDN So-interface 24 is connected to the line terminating unit 26 over the transmission arrangement 27. The line terminating unit 26 is further connected to a bus system 31 over which control signals, address signals and speech signals are supplied. The speech processor 25 which is also connected to the bus system 31 comprises an analog-to-digital converter and a digital-to-analog converter for converting the analog speech signals coming from the handset with a cord 2, the microphone 21 and the analog input 22 into digital speech signals or for converting the digital speech signals supplied by the bus system 31 into analog speech signals for the handset with a cord 2, the loudspeaker 20 and the analog input 22 respectively. The circuit 28 for controlling the display 8 and the key pad 9 is also connected to the bus system 31. The speech processor 25, the line terminating unit 26 and the circuit 28 are controlled by a main control circuit 29 also connected to the bus system 31. An adapter circuit 30 is connected to the data interface 23 (V24 interface), which circuit sends the signals supplied by the data interface 23 onto the bus system 31 and applies the signals received from the bus system 31 to the data interface 23. The circuit components 25, 26, 27, 28, 29 and 30 included in the main circuit 10 are further described in the publications of PKI Technische Mitteilungen, Vol. 1: 1987, pp. 13 to 18 and PKI Technische Mitteilungen, Vol. 1, 1988, pp. and 19 to 22.

The auxiliary circuit 13 comprises a base speech processor 32 connected to the bus system 31, an auxiliary control circuit 33 and a base radio circuit 34. The aerial 12 is connected to the base radio circuit 34. A conversion from analog-to-digital or from digital-to-analog signals respectively, is effected in the base speech processor 32 by means of a digital-to-analog converter or an analog-to-digital converter. In the base radio circuit 34 the analog signals are transmitted as high-frequency signals over the aerial 12 to an aerial 35 of the mobile handset 3 or the analog high-frequency signals are received through the aerial 12. The auxiliary control circuit 33 which is also connected to the bus system 31 and receives control signals from the main control circuit or transceiver 39 controls the base speech processor 32 and the base radio circuit 34.

The mobile circuit 19 which is accommodated in the mobile handset 3 comprises the battery 14, a mobile radio circuit or transceiver 36, a mobile control circuit 37, a mobile speech processor 38 and a circuit 39 for controlling the display 18 and the key pad 17. The microphone 15 and the loudspeaker 16 are connected to the mobile speech processor 38. The signals processed by the mobile speech processor 38 are applied to the mobile radio circuit 36 or received therefrom respectively. The aerial 35 is connected to the mobile radio circuit 36. The circuits 36, 38 and 39 are controlled by the mobile control circuit 37. The circuits 32 to 34 in the auxiliary circuit 13 and the circuits 36 to 39 in the mobile circuit 19 are each further described in the publication of PKI Technische Mitteilungen, Vol. 2, 1988, pp. 7 to 14.

The handset 2 with a cord or the hands free facility with the loudspeaker 20 and the microphone 21 and the mobile handset 3 can be reached under one common dialling number. By adding an extension figure to the dialling number, however, the handset with a cord, the hands free facility and the mobile handset 3 can also be called separately. It is also possible to supply signals to a plurality of mobile handsets through the auxiliary circuit 13 over the radio transmission link. Each mobile handset can then be reached individually also the addition of an extension figure to the dialling number.

I claim:

1. A telephone set for an integrated services digital network (ISDN) having a plurality of message channels, each message channel having a capacity of 64 kbit/s, said telephone set comprising one main module only and a handset with a connection cord, said main module comprising a main circuit which includes means for generating control signals for communication from the handset with a connection cord, and one line terminating unit only for coupling to an interface for said network, said main circuit being arranged for transmitting signals between the handset with a connection cord and the line terminating unit, wherein the telephone set further comprises:

at least one mobile handset, and an auxiliary circuit, coupled to said main module, comprising a radio transceiver for communication with said at least one mobile handset, and means for processing and transmitting signals between said main module and said transceiver; and wherein said main module comprises a controller for transmitting respective signals from said handset with a connection cord and from said at least one mobile handset at the same time over different respective ones of the message channels of the integrated services digital network.

2. A set as claimed in claim 1, wherein the means for generating control signals includes a keypad on said module.

3. A telephone set for an integrated services digital network (ISDN) having a plurality of message channels, said telephone set comprising one main module only and a handset with a connection cord, said main module comprising a main circuit which includes a speech processor for processing speech signals transmitted to and from the handset with a connection cord, means for generating control signals for communication from the handset with a connection cord, and one line terminating unit only for coupling to an interface for said network, said main circuit being arranged for transmitting signals between the handset with a connection cord and the line terminating unit, wherein the telephone set further comprises:

at least one mobile handset, an auxiliary circuit, and a digital bus system, wherein said digital bus system forms a part of and interconnects said main module and said auxiliary circuit, wherein said auxiliary circuit comprises a radio transceiver for communication with said at least one mobile handset and means for processing and transmitting signals between said digital bus system and said radio transceiver, and wherein said main module comprises a controller for transmitting respective signals from said handset with a connection cord and from said at least one mobile handset at the same time over different ones of the message channels of the integrated services digital network.

4. A set as claimed in claim 3, wherein characterized in that the means for generating control signals includes a keypad on said module.

5. A set as claimed in claim 4, wherein said means for generating control signals further includes a circuit for controlling the keypad, said bus system interconnects said line terminating unit, said speech processor, and said circuit for controlling the keypad, and said auxiliary circuit comprises a base speech processor coupled to said bus system and said transceiver, and an auxiliary control circuit for controlling said transceiver and said base speech processor by means of control signals over said bus system.

6. A set as claimed in claim 3, wherein said auxiliary circuit comprises a base speech processor coupled to said bus system and said transceiver, and an auxiliary control circuit for controlling said transceiver and said base speech processor by means of control signals over said bus system.

7. A set as claimed in claim 4, further comprising a battery charger for charging said mobile handset, and a submodule containing said auxiliary circuit and said battery charger.

8. A set as claimed in claim 7, wherein said digital message channels each have a capacity of 64 kbit/s, and said system further comprises a signalling channel.

* * * * *